United States Patent
Vangala et al.

(10) Patent No.: US 12,299,618 B2
(45) Date of Patent: May 13, 2025

(54) RECOMMENDATIONS OVER MEETING LIFE CYCLE WITH USER CENTRIC GRAPHS AND ARTIFICIAL INTELLIGENCE

(71) Applicant: Microsoft Technology Licensing, LLC, Redmond, WA (US)

(72) Inventors: Vipindeep Vangala, Hyderabad (IN); Rajeev Gupta, Hyderabad (IN); Abhishek Arun, London (GB); Daniel Dechelotte, Houilles (FR); Sangita N. Pitre, Hyderabad (IN); Prakash Kumar Pandey, Bihar (IN); Grzegorz S. Kukla, Sliwice (PL); Sarunas Marciuska, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 17/854,247

(22) Filed: Jun. 30, 2022

(65) Prior Publication Data
US 2024/0005244 A1   Jan. 4, 2024

(51) Int. Cl.
*G06Q 10/00* (2023.01)
*G06Q 10/0633* (2023.01)

(52) U.S. Cl.
CPC ................ *G06Q 10/0633* (2013.01)

(58) Field of Classification Search
None
See application file for complete search history.

(56) References Cited

U.S. PATENT DOCUMENTS

| | | | |
|---|---|---|---|
| 11,222,052 B2* | 1/2022 | Hertz | G06N 5/00 |
| 2016/0180480 A1* | 6/2016 | Gross | G06Q 50/184 |
| | | | 705/310 |
| 2017/0039663 A1* | 2/2017 | Gross | G06Q 10/0633 |
| 2019/0370615 A1* | 12/2019 | Murphy | G06F 9/541 |
| 2020/0372079 A1* | 11/2020 | De Vries | G06F 16/906 |
| 2021/0406935 A1* | 12/2021 | Singhai | G06Q 30/0205 |
| 2022/0198298 A1* | 6/2022 | Chow | G06Q 10/10 |
| 2022/0198349 A1* | 6/2022 | Perincherry | G06Q 10/0637 |
| 2022/0277848 A1* | 9/2022 | O'Connor | G16H 50/20 |

(Continued)

OTHER PUBLICATIONS

Malliaros, et al., "The Core Decomposition of Networks: Theory, Algorithms and Applications", Jan. 2020, In Journal of The LDB Journal, vol. 29, Issue 1, pp. 61-92. (Year: 2020).*

(Continued)

*Primary Examiner* — Joseph M Waesco
(74) *Attorney, Agent, or Firm* — Shook, Hardy & Bacon L.L.P.

(57) ABSTRACT

Aspects of the present disclosure relate to identifying relationships between entities in a user graph relative to a specific user. The identified relationships may provide user specific insights on related entities from across the enterprise environment. The insights may be provided to the user in a graphical user interface which may organize the insights into categories of information with selectable features to permit user interaction with the insights. Thus, the insights provided from the user graph or user sub-graph according to aspects described herein, may improve productivity and the potential for collaboration across the enterprise environment while reducing user workload.

20 Claims, 9 Drawing Sheets

(56) References Cited

U.S. PATENT DOCUMENTS

| | | | | |
|---|---|---|---|---|
| 2022/0342912 A1* | 10/2022 | Dhir | ............... | G06F 16/2458 |
| 2023/0214753 A1* | 7/2023 | Eidelman | ............ | G06N 5/02 |
| | | | | 705/7.37 |

OTHER PUBLICATIONS

Malliaros, et al., "The Core Decomposition of Networks: Theory, Algorithms and Applications", In Journal of The VLDB Journal, vol. 29, Issue 1, Jan. 2020, pp. 61-92.

"International Search Report and Written Opinion Issued in PCT Application No. PCT/US23/022474", Mailed Date: Sep. 15, 2023, 10 Pages.

\* cited by examiner

RECOMMENDATIONS OVER MEETING LIFE CYCLE WITH USER CENTRIC GRAPHS AND ARTIFICIAL INTELLIGENCE

BACKGROUND

As hybrid and remote work becomes more common in the enterprise environment, connecting team members from around the world has become a vital part of the modern workplace. As a result, enterprise organizations generate and manage large volumes of data relating to the enterprise itself, individual users within the enterprise, and other entities. However, keeping track of the data and leveraging it to improve productivity is challenging in a distributed enterprise environment. Unfortunately, this may cause important data or deadlines to be missed and limit the ability of team members to recognize opportunities for collaboration.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to identifying relationships between entities in a user graph relative to a specific user. The identified relationships may provide user specific insights on related entities from across the enterprise environment. The insights may be provided to the user in a graphical user interface which may organize the insights into categories of information with selectable features to permit user interaction with the insights. Thus, the insights provided from the user graph or user sub-graph according to aspects described herein, may improve productivity and the potential for collaboration across the enterprise environment while reducing user workload.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
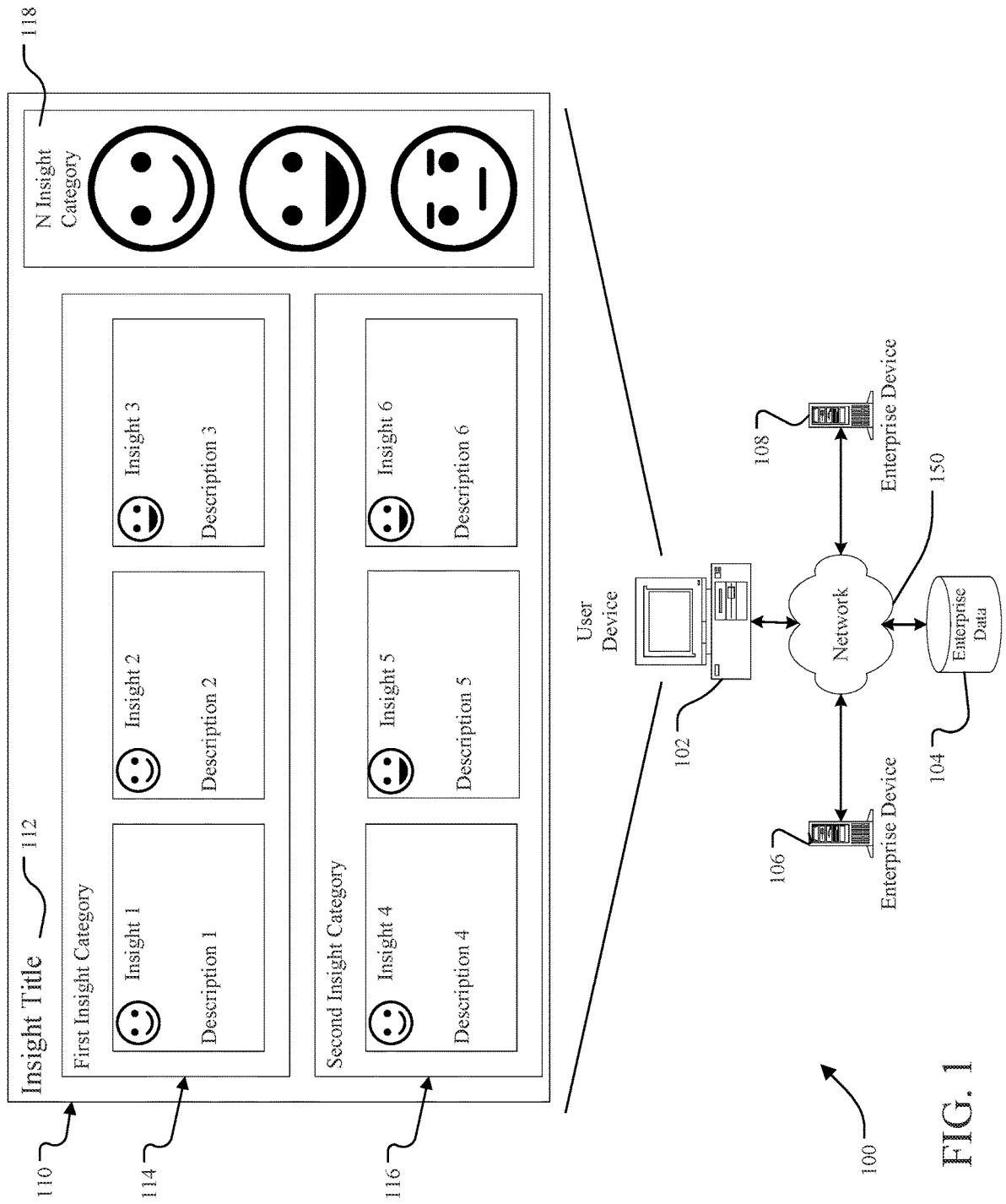
FIG. 1 illustrates an exemplary environment 100 for providing insights based on a user graph according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, an enterprise or other distributed network with many users generates and stores a very high volume of entity data within an enterprise database. Independently, the entity data in the enterprise database is useful on a limited basis within the narrow connections between users, documents, and other topics already existing in a workflow, office, or project assignment management system. However, as the modern workplace expands to hybrid and remote work models, it may be difficult to manage the large volume of data to provide value and increase productivity within the enterprise. To improve entity data management, it may be preferable to define relationships between different entities and present the relationships to a user. Traditional approaches to entity data management identify related content based on string lookup for a specific topic. However, the traditional approach is limited in that it does not personalize results based on the user, needs at least one keyword or key phrase to identify relationships, and doesn't provide semantic context. Often, the traditional approach returns the same or similar results to each user which reduces the likelihood of user interaction with the results because the results may lack value relative to the user's work experience.

Accordingly, aspects of the present disclosure relate to identifying relationships between entities on a user graph relative to a specific user and generating insights based on these relationships. A user graph may be analyzed, according to aspects described herein, to provide user specific insights on related entities from across the enterprise environment. The insights may be provided to the user in a graphical user interface which may organize the insights into categories of information with selectable features to permit user interaction with the insights. The insights generated may apply across the range of applications (e.g., word processing, email, meeting organizer, presentation developer, group chat features, etc.) utilized by the user as well as to the various activities of the user's workday (e.g., meeting lifecycle, action items, due dates for tasks, etc.). The approach aims to combine semantic context and a user personalized knowledge graph to connect related entities with a user in a generation pipeline across the network. The user graph enables the approach to capture entity relatedness based on a plurality of nodes associated with enterprise data. One benefit of the approach is that it retrieves high quality related entities based on user association to provide richer insights. The combination of semantic context and user association reduces incorrectly related entities and improves personalization of the insights. Additionally, the graphical user interface format simplifies insight presentation by providing a compact view of interrelatedness which reduces cognitive load on the user in processing and utilizing the insights.

FIG. 1 illustrates an exemplary environment 100 for providing insights based on a user graph according to aspects described herein. As illustrated, the environment 100 includes a user device 102, network 150, enterprise data store 104, enterprise device 106, enterprise device 108, and graphical user interface 110. For ease of discussion, the description herein refers to a single user device 102 and a single enterprise device 106. But features and examples of the user device 102 and the enterprise device 106 are applicable to multiple devices such as enterprise device 108. As such, aspects of enterprise device 108 are not necessarily re-described below in detail.

In environment 100, user device 102 communicates over network 150 with enterprise data store 104 as well as enterprise devices 106 and 108. A request for insights for an entity of interest on a user graph may be received and processed at enterprise device 106. The user graph may be stored on enterprise data store 104 and transmitted to enterprise device 106 via network 150. The enterprise device may analyze the user graph to determine related entities and generate insights based on the related entities. The insights may be returned to user device 102, via network 150, for display on graphical user interface 110. Graphical user interface 110, in accordance with aspects of the present disclosure, includes an insight title 112, and a plurality of insight categories including a first insight category 114, a second insight category 116, up to N insight category 118.

In a typical scenario, a trigger event may occur which indicates that insights could be provided to the user. A trigger event may be a variety of events that may be explicit or implicit to indicate that insights should be generated. An explicit trigger may occur when a user is interacting with user device 102 and expressly requests insights related to an entity of interest. For example, a user may select a link or button either in an application or on the user graph directly, that initiates the generation and presentation of insights on graphical user interface 110 related to an entity of interest. An implicit trigger may occur based on a variety of actions which indirectly indicate to the system that insights could be generated from a user graph related to the entity of interest. For example, a user may accept a meeting invitation which may indirectly indicate the system could generate insights from the user graph related to the meeting as the entity of interest. Additionally, accepting the invitation may be a broader implicit trigger to provide insights throughout the entire meeting lifecycle. In this case, insights may be generated without explicit user request related to pre-meeting preparation, meeting attendance, and post-meeting deliverables or follow-ups. In another example, the user may be assigned the task of drafting a document which may implicitly trigger the system to generate insights to assist in the drafting process. Additional examples of implicit triggers may include changing a job title associated with a user node, a user changing a department, adding one or more new contacts, documents, or events within the enterprise data store, or other changes to the user graph. From the enterprise perspective implicit insights may include designing the system to provide periodic insights to the user based on a variety of entities of interest including daily workflow, meeting life cycle events, updates to entities, the arrival of new co-workers and/or clients, etc.

Following the trigger event, the enterprise device 106, may request a user graph from enterprise data store 104 via network 150. The user graph may be a representation of the specific user's digital ecosystem within the enterprise organization. The user graph and entity data may be stored on the enterprise data store 104. The enterprise device 106 may slice the user graph into a user sub-graph by centering it on the entity of interest then analyze it to determine related entities. Analysis of the user sub-graph may be performed using a variety of approaches including using graph walks or random walks based on an entity of interest in the user sub-graph; using clustering algorithms on top of the graph to group and identify closely related entities; and/or creating embeddings that can be used at runtime to find semantically matching entities related to the entity of interest. Each of the described approaches may be applied singularly or together with another approach. The related entities may be ranked and filtered to generate meeting insights, which may be provided to the user device 102 via network 150. Insights may be recommendations of related entities which could be useful to the user. The insights provided to a user based on the analysis of the user sub-graph may be specific to that user and distinct from the insights provided to other users. For example, there may not be overlapping insights provided to two users requesting insights for the same meeting or entity of interest.

The user may receive the insights on user device 102 in a variety of ways (e.g., as an email, as a link in an email or chat to a document, as a notification that the insights are available to be viewed from a location on user device 102, etc.) for display on a plurality of applications (e.g., email, chat, web browser, etc.). The insights may be provided in a variety of formats (e.g., as a document, a pdf, an image, etc.). Graphical user interface 110 may be representative of how the insights are displayed on user device 102. Graphical user interface 110 may include an insight title 112 which could reference the entity of interest and/or the triggering event. The organization of the insights is variable based on the user device 102 and available display format for graphical user interface 110. In the exemplary environment 100, the graphical user interface 110 is shown as having horizontal displays first insight category 114 and second insight category 116, as well as vertical display N insight category 118. Within the insight category there may be a plurality of insights and corresponding information displayed to the user. Some of the insights and/or information displayed may be selectable while other insights and/or information may not be selectable.

As will be appreciated, the various methods, devices, applications, nodes, features, etc., described with respect to FIG. 1 or any of the figures described herein, are not intended to limit the system to being performed by the particular applications and features described. Accordingly, additional configurations may be used to practice the methods and systems herein and/or features and applications described may be excluded without departing from the methods and systems disclosed herein.

Figure 2A:
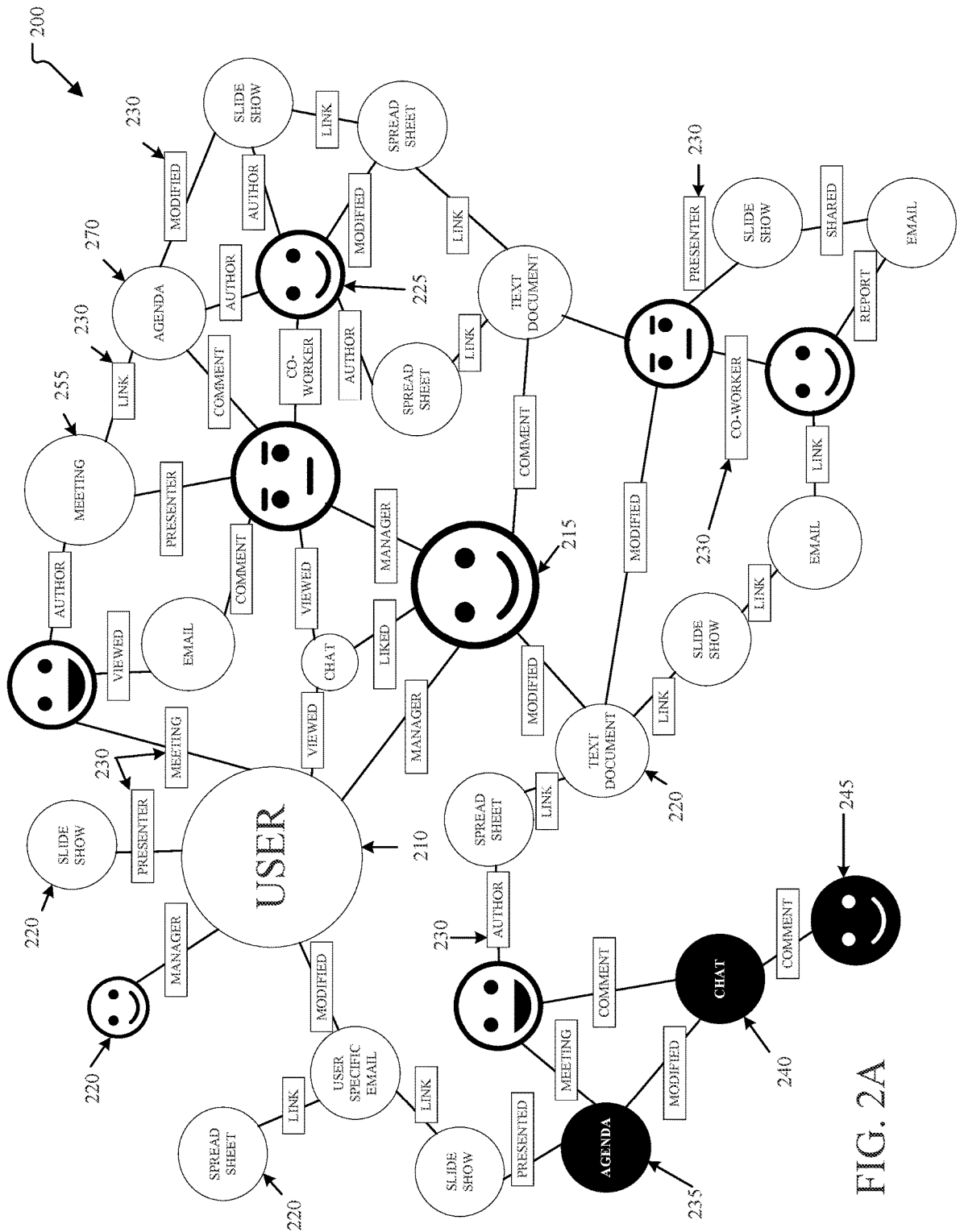
FIG. 2A illustrates an exemplary user graph for a user with a plurality of nodes and relationships.

FIG. 2A illustrates an exemplary user graph for a user with a plurality of nodes and relationships. In the example shown in FIG. 2A, the user graph 200 includes user node 210, manager node 215, a plurality of example entity nodes 220, a co-worker node 225, a plurality of relationships 230, agenda node 235, chat node 240, commenter node 245, meeting node 255, and agenda node 270. The user graph 200 may be a user-centric, heterogenous, in-memory graph of a user's data sourced from an enterprise data store (e.g., enterprise data store 104). The user graph 200 may be composed of a plurality of nodes representing entities associated with the enterprise and edges between nodes representing relationships among the entities. A user graph may be created for each user, shown as exemplary user, such that each user across the enterprise organization has a corresponding user graph that contains different entities and relationships between entities than other users within the enterprise. The user graph may be updated on a periodic basis based on the design characteristics selected such as daily, weekly, and/or a longer period. If embeddings are generated for an entity within the user graph the embedding may be updated on a periodic basis as well, such as daily, weekly, and/or a longer period.

To protect user's privacy, the user graph is accessible only to the user 210 associated with the user graph. The user graph may be stored as one or more data structures, database entries, or other suitable format at a user store on an enterprise data store (e.g., enterprise data store 104). In the exemplary user graph 200, a user node 210 is shown with a plurality of entity 220 nodes and relationships 230 displayed connected to the user in varying degrees of relatedness. Some nodes within the user graph 200 may not be directly related to one another, but are related through one, two, three, or more intermediate related nodes and ultimately they may be related back to the user 210 through a similar relationship process. The benefit of the user graph with a plurality of nodes is that it provides efficient access to the entities, relationships, and knowledge at runtime with low latency.

The user graph may be a representation of the specific user's digital ecosystem within the enterprise organization. An entity 220 may be individual aspects of the specific user's digital ecosystem. Entities may include both publicly available information within the enterprise as well as user specific information. Publicly available entity information may be stored on an enterprise data store (e.g., enterprise data store 104) and may be visible on a plurality of user graphs in addition to the user graph 200 for user 210. Examples of publicly available entities may include: users, documents, emails, meetings, chats, conversations, teams of people within the enterprise, client lists, meeting agendas, presentations, preferences, tasks, topics, topic-based groups, memberships, publicly available calendars, slide shows, videos, vendors, images, files, knowledge stores, libraries within the enterprise, web-based collaborative platforms, websites, internet links, applications, meeting attendance lists, addresses or locations where a meeting or event will occur, recordings, phone numbers, email addresses, user contact information, organization contact information, team contact information, and/or other aspects of the user's digital ecosystem. Privately available entities may include information that is specific to user 210 and visible only to that user. Privately available entities may be shown in the user graph 200 for user 210 but not in a plurality of other user graphs. Privately available entities may include personal identifying information, personal email, personal calendar, local documents, and/or top contacts for the user, etc. Information available to a certain user as either public or private entity may vary based on the user privacy permission, access level granted to the user within the enterprise, and/or network access permissions granted to the user. Each entity may also include the metadata associated with the entity.

A relationship 230, may be an identified connection between an entity and one or more other entity. The relationships may be shown on the user graph as a line or other visual indicator. The relationship line between nodes may represent a measure of how closely related two entities are rather than a physical distance between the entities. The shorter the relationship line the more closely related the two entities are. Whereas, the longer the relationship line the less closely related the two entities are. For example, the relationship line between commenter 245 and chat 240 is short because the commenter 245 directly entered the chat and has a close relationship to that entity. The relationships between entities may include document authorship or modification by a user (or group), document sharing by a user, meeting invites or attendance status by a user, linked data between documents, comments and/or replies to comments or chats, emails and email replies, role of the user or another entity to a third entity (e.g., presenter, co-worker, manager, author, etc.) or other suitable relationships. For example, user 210 shares a relationship with the manager 215. In some scenarios, multiple different relationships may be present between two or more nodes and displayed on the knowledge graph. A text box defining the relationship line may or may not be visible on the relationship line or it may be visible if the line is selected or hovered over.

In various examples, nodes, edges, and relationships of the user graph may include content, metadata, or both content and metadata. For example, content of the slideshow node 255 may include text documents, images, slideshows, and animations that appear within the corresponding meeting. Metadata may include a number of times that the slideshow has been presented, viewed, or modified, a file size for the text document, a slide count for the slideshow, times when the slideshow was accessed, a duration of time since a most recent access, etc. Some nodes, edges, and relationships of the user graph may contain metadata that is not present within other nodes. In some instances, the user graph may be interactive and selectable by the user such that content and/or metadata associated with the node, edge, or relationship may be accessed.

In some scenarios, the importance of an entity 220 may be conveyed on the user graph 200 based on the size of the node, such that larger nodes may convey more importance while smaller nodes convey less importance. Importance may be determined based on a variety of factors which may be considered individually or collectively including number of relationships connecting to the entity, role of the entity within the entire enterprise, role of the entity within a slice or sub-graph, number of times accessed by the user or group of users, distance of the entity from the entity of interest of the graph, and/or other factors. For example, in user graph 200 entity 215 may have the role of manager in the enterprise and thus have a larger node than entity 225 who may be a co-worker that is distantly related to user 210. Additionally, groupings of nodes may be displayed by shading or coloring the nodes and/or relationship lines. For example, entities associated with engineering group may be shaded white to indicate group status, such as user 210 and manager 215. Conversely entities associated with the finance group may be shaded black to indicate group status, such as agenda 235, chat 240, and commenter 245.

Figure 2B:
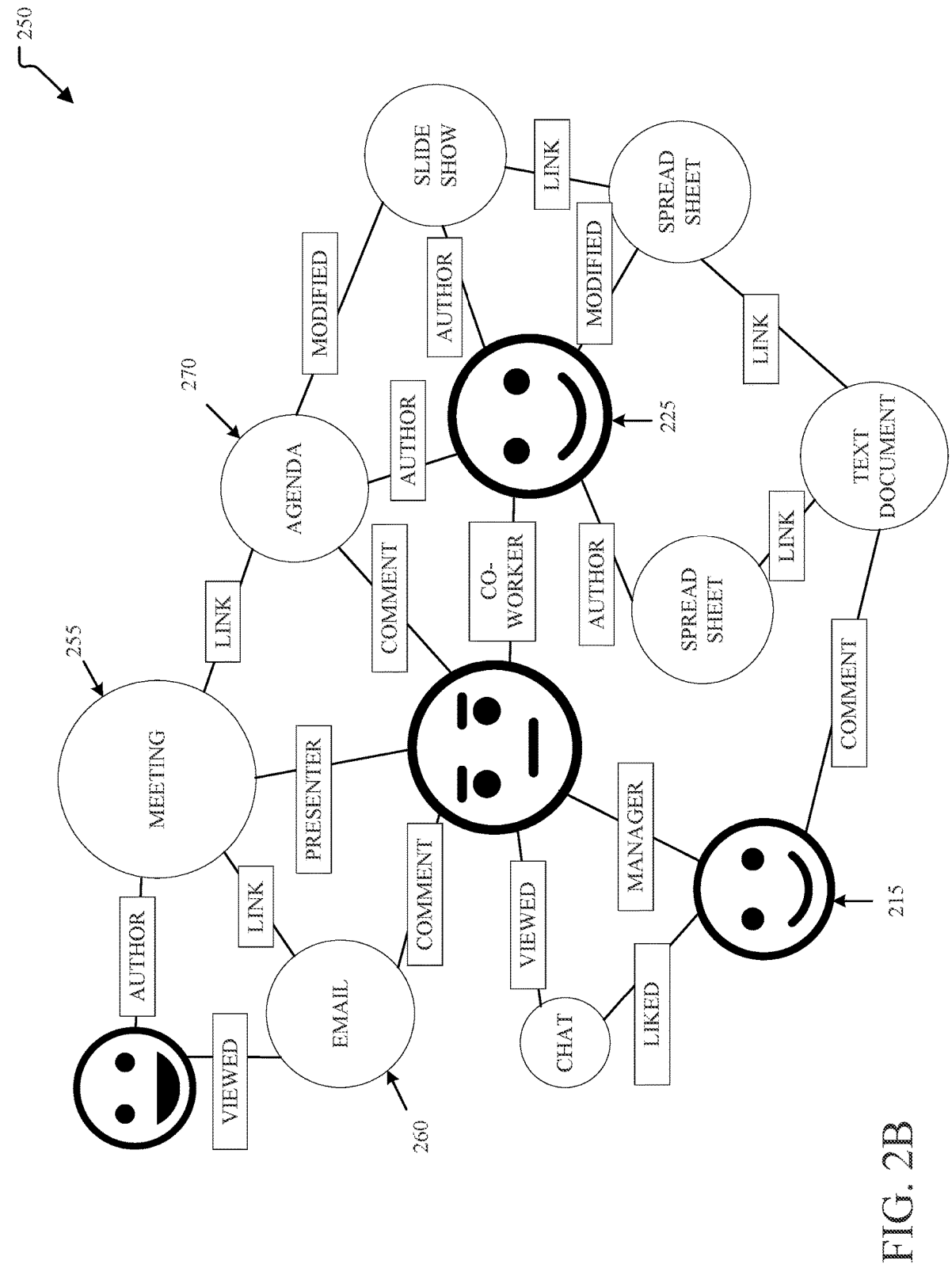
FIG. 2B illustrates an exemplary user graph for a user sliced on an entity of interest with a plurality of nodes and relationships.

FIG. 2B illustrates an exemplary user graph for a user sliced on an entity of interest with a plurality of nodes and relationships. In the example shown in FIG. 2B, the user sub-graph 250 includes manager node 215, co-worker node 225, meeting node 255, email node 260, and agenda node 270. In examples, the user graph may include a plurality of entities such that performing analysis of the full user graph for each generation of insights based on a trigger may be too time-consuming. To improve latency times, the user graph may be sliced into a user sub-graph on an entity of interest existing within the user graph and insights may be generated from the user sub-graph. The user sub-graph may represent a contextual personalized user graph based on the entity of interest. The entity of interest may be an entity from the user graph which is sliced to create a user sub-graph. The user sub-graph may be analyzed to generate insights related to the entity of interest. For example, a trigger may be received for insights relating to meeting 255 as the entity of interest in a user sub-graph. The user graph 200 may be sliced on the meeting 255 as the entity of interest to identify user sub-graph 250 as shown in FIG. 2B.

In some instances, the identified user sub-graph may modify the relationships between entities. Some relationships that exist in the user graph may be removed as entities are not present in the user sub-graph. For example, user 210 has been removed from the user sub-graph 250. Likewise, new relationships may be recognized in the user-sub-graph as the entity of interest is the focal point of the user sub-graph. For example, in user sub-graph 250 a new relationship is identified between meeting 255 and email 260 which was not identified in the user graph 200. In some instances, the relationship line as a measure of relatedness between entities may remain constant, increase, or decrease on the user sub-graph relative to the user graph. For example, the relationship line increased between meeting 255 and email 260. In other instances, the relative importance of an entity as evidenced by its node size may remain constant, increase, or decrease on the user sub-graph relative to the user graph. For example, in user sub-graph 250, entity 225 may be a co-worker who is the author of agenda 270 for the meeting 255. The size of the node for co-worker 225 has increased in the user sub-graph as the importance of co-worker 225 has increased. Conversely, the node for manager 215 has decreased in size as the manager 215 is less related to meeting 255.

Slicing the user graph 200 into a user sub-graph provides two benefits. First, it may reduce the number of nodes and relationships which need to be processed to generate insights, which improves latency times. Second, by removing entities from the user sub-graph 250 new and/or more diverse relationships can be identified which may improve the usefulness of insights to the user.

Although only a small number of nodes are shown in FIGS. 2A and 2B for clarity, it will be appreciated that an enterprise organization with hundreds or thousands of employees and their associated documents, meeting calendars, etc. may have millions of nodes with billions of edges for relationships among those nodes.

Figure 3:
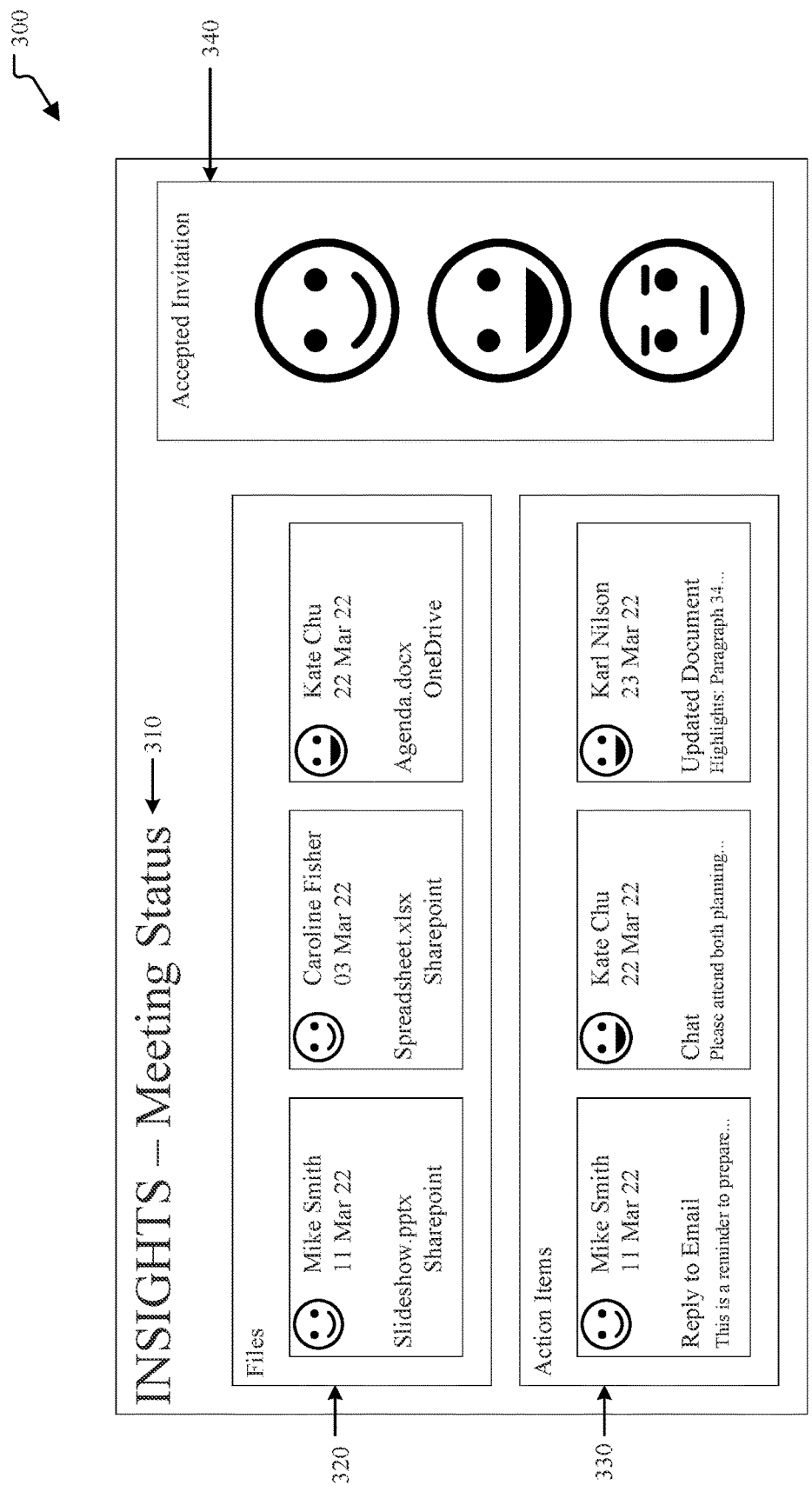
FIG. 3 illustrates an example of a graphical user interface 300 for displaying insights to the user based on a user graph or a user sub-graph, according to aspects described herein.

FIG. 3 illustrates an example of a graphical user interface 300 for displaying insights to the user based on a user graph or a user sub-graph, according to aspects described herein. In the example illustrated in FIG. 3, the graphical user interface 300 includes an insight title labeled INSIGHTS—Meeting Status 310, and insight categories labeled Files 320, Action Items 330, and Accepted Invitations 340. Insights may be recommendations of related entities generated from the personalized user graph or user sub-graph, which could be useful to the user. For example, insights may include potential new relationships with other co-workers, clients or vendors, insights into workflow patterns that the user could apply to their own workflow, updates to entities which the user may want to review, aspects of the meeting life cycle which are new, have changed or been updated, tasks that are remaining to be accomplished by the user or have recently been accomplished by another user, etc. The graphical user interface may include an insight title which could reference the entity of interest and/or the triggering event. For example, graphical user interface 300 includes an insight title labeled INSIGHTS—Meeting Status 310 is referenced to the entity of interest for the user sub-graph meeting (as described in FIG. 2B).

The organization of the insights within the graphical user interface is variable based on the user device and available display format for graphical user interface. In the present example, the graphical user interface 300 is shown as having two horizontal insight categories Files 320 and Action Items 330 as well as vertical display recommended connections 340. Within the insight category there may be a plurality of insights and corresponding information displayed to the user as icons. Examples of corresponding information displayed for an insight may include a picture of the related entity, a name of related entity, date of creation or last edit, title of the entity, storage location, sub-icons displaying additional links, text associated with the entity, and/or other applicable information. Some of the insights and/or information displayed may be selectable while other insights and/or information may not be selectable. For example, in Files 320 there are three selectable icons displayed each for a separate file. The icons include a picture of the related user, the related user's name, date of last edit or creation, the title of the file associated with the insight, and the storage location. In Action Items 330, remaining tasks to accomplish by the user are presented as icons with a picture of the related user, the related user's name, date of last action, a selectable prompt to remind the user of the action, and a summary of the action. In accepted invitation 340, selectable icons of related users who have accepted the meeting invitation are displayed.

Figure 4:
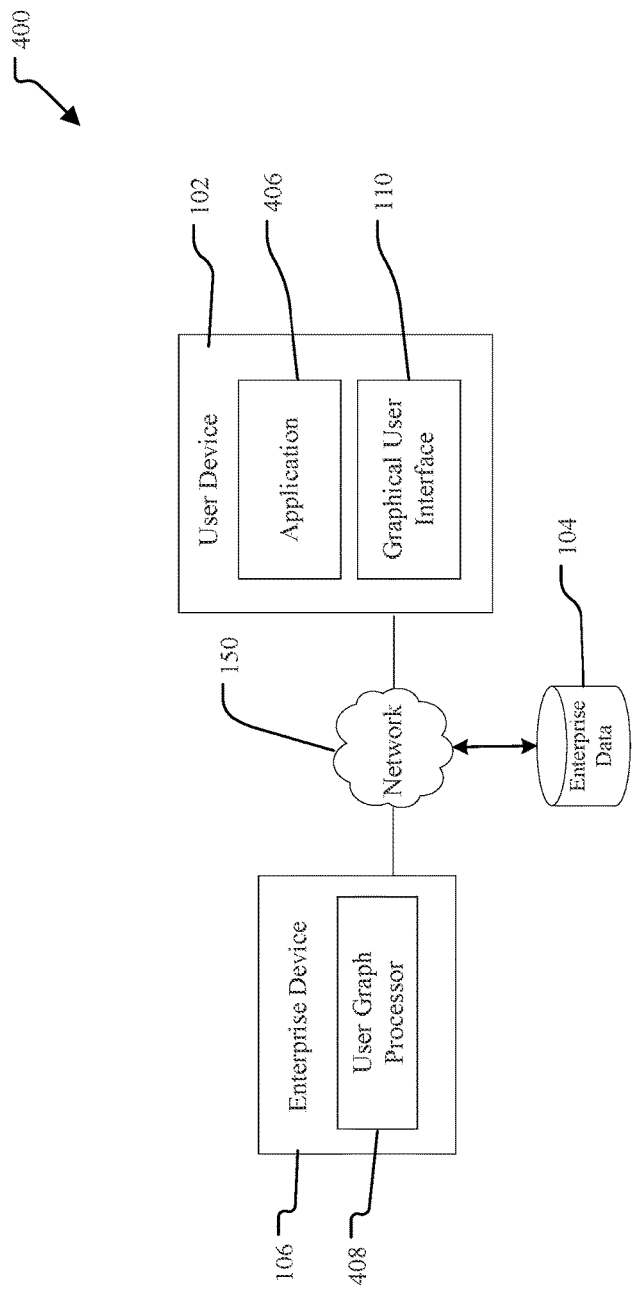
FIG. 4 is a diagram illustrating a system for generating insights based on a user graph or a user sub-graph, according to aspects described herein.

FIG. 4 is a diagram illustrating a system for generating insights based on a user graph or a user sub-graph, according to aspects described herein. As illustrated, system 400 comprises a user device 102, an application 406, a graphical user interface 110, a network 150, an enterprise data store 104, an enterprise device 106, and a user graph processor 408. For ease of discussion, the description herein refers to a single user device 102, a single enterprise data store 104, and a single enterprise device 106. But features and examples of the user device 102, the enterprise data store 104, and the enterprise device 106 are applicable to multiple devices (e.g., enterprise device 108 in FIG. 1).

The network 150 may comprise one or more networks such as local area networks (LANs), wide area networks (WANs), enterprise networks, the Internet, etc. and may include one or more of wired, wireless, and/or optical portions.

User device 102 may be any type of computing device that can receive, process, modify, and communicate content on the network 150. Examples of a user device 102 include a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). User device 102 may be configured to execute one or more software applications (or "applications") and/or services and/or manage hardware resources (e.g., processors, memory, etc.), which may be utilized by users of the user device 102 and/or the enterprise device 106. The user device may include an application 406 which displays content for use on the user device 102 and for communication across the network 150. The application 406 may be a native application or a web-based application. Application 406 may operate substantially locally to user device 102 or may operate according to a server/client paradigm in conjunction with one or more servers (not shown).

Graphical user interface 110 may be utilized to receive and display insights generated by user graph processor 408 based on a user graph or user sub-graph. Graphical user interface 110 functions in a substantially similar way to those aspects described in FIG. 1 and FIG. 3, and for ease of discussion will not be redescribed here.

The enterprise data store 104 is configured to store enterprise data, for example, individual user data for each enterprise user which may be utilized to generate the user graph. In various embodiments, enterprise data store 104 is a network server, cloud server, network attached storage ("NAS") device, or another suitable computing device. Enterprise data store 104 may include one or more of any type of storage mechanism, including a magnetic disc (e.g., in a hard disk drive), an optical disc (e.g., in an optical disk drive), a magnetic tape (e.g., in a tape drive), a memory device such as a random-access memory (RAM) device, a read-only memory (ROM) device, etc., and/or any other suitable type of storage medium. Although only one instance of the enterprise data store 104 is shown in FIG. 4, the system 400 may include two, three, or more similar instances of the enterprise data store 104. Moreover, the network 150 may provide access to other data stores, similar to enterprise data store 104 that are located outside of the system 400, in some embodiments.

Enterprise device 106 may include one or more server devices, distributed computing platforms, cloud platform devices, and/or other computing devices such as user graph processor 408. Enterprise device 106 and user graph processor 408 may communicate with enterprise data store 104 and user device 102 via network 150.

User graph processor 408 analyzes the user graph to determine closely related entities to the entity of interest on the user graph or the user sub-graph. When a triggering event occurs, the enterprise device 106 may request a user graph and/or a user sub-graph from the enterprise data store 104 via network 150. The graph may be passed to user graph processor 408 to determine closely related entities to the entity of interest from the graph. Analysis of the user graph or user sub-graph may be performed using a variety of approaches including: using graph walks or random walks based on an entity of interest in the user sub-graph; using clustering algorithms on top of the graph to group and identify closely related entities; and/or creating embeddings that can be used at runtime to find semantically matching entities related to the entity of interest. Each of the described approaches may be applied singularly or together with another approach.

One approach for determining closely related entities to the entity of interest is by using personalized graph walk algorithms on the user sub-graph. The personalized graph walk is performed on entities within the sub-graph relative to the entity of interest. The personalized graph walk may compute personalized page rank (PPR) scores of relatedness to the entity of interest for the entities within the user sub-graph. Since the user sub-graph is personalized to the user and the entity of interest performing graph walks may generate richer semantic matches to the entity of interest. For example, the entity of interest for a sub-graph may be a meeting connected to a key phrase acronym AIG which may stand for AI Graph. In performing the graph walk, entities may be identified and scored that include not just the acronym AIG but also the underlying phrase associated with the acronym AI Graph. A personalization vector may be set for the graph walk or random walk to always restart at the node corresponding to the entity of interest. At convergence, a PPR score for all entities within the user sub-graph may be obtained with respect to the entity of interest. The PPR scores may be aggregated for multiple entity types such as user to user, user to document, user to meeting, etc. In instances, additional weight may be given to certain relationship types to prioritize that relationship type within the resulting PPR scores. For example, if the entity of interest is a meeting, user to meeting invitee or user to meeting document may be more heavily weighted such that they have a higher score. From the graph walk determined PPR scores, the entities with high scores may be categorized as closely related entities.

Another approach for determining closely related entities, which may be applied by the user graph processor 408, is using clustering algorithms on top of the graph to group and identify closely related entities. A cluster may be a grouping of entities on the user sub-graph that are similar to each other based on some similarity measure. The action of clustering may be performed as an unsupervised machine learning task using clustering algorithms to process the entities of the user sub-graph based on similarity scores. A similarity score may be a measure of similarity between entities within a cluster as well as with entities not in the cluster. Similarity scores for entities could be generated using various kinds of similarity measures such as semantic similarity using distributed embeddings (e.g., word2vec, BERT, GloVE, FastText, etc.), or other common density-based, distribution-based, centroid-based, or hierarchical-based methods.

Clusters may be generated by comparing an entities similarity score to a threshold value. In such instances, the cluster may be generated where entities with similarity scores higher than the threshold value may form a cluster, while entities whose similarity score is below the threshold may not be added to the cluster. For example, if the threshold value is 0.6, then an entity with a similarity score of 0.88 may be grouped in the cluster while an entity with a similarity score of 0.49 may not be. It is contemplated that some entities may have similarity scores which place them in more than one cluster. Likewise, there may be entities whose similarity score does not place them in a cluster. The effectiveness of the user graph processor 408, does not require complete categorization of each entity into a cluster, nor does it require discrete clusters. Clusters may be static, or they may be continually updated as the user graph and user sub-graph are updated, and/or as the entity of interest is modified. The more refined a cluster becomes by increasing the threshold for the similarity score, it potentially becomes more useful because the entities in the cluster are more similar to each other. A variety of clustering algorithms may be utilized to create the clusters of entities such as KMeans, DBscan, topic modeling, Gaussian Mixture Model, balance iterative reducing and clustering using hierarchies (BIRCH), affinity propagation clustering algorithm, mean-shift, ordering points to identify the clustering structure (OPTICS), agglomerative hierarchy, divisive hierarchical, spectral clustering, latent Dirichlet allocation, and/or probabilistic latent semantic analysis among others. It should be appreciated that the potential similarity measures and clustering algorithms described are not exhaustive lists and other methods may be utilized. The entities that are identified as high scoring within a cluster may be categorized as closely related entities.

An additional approach for determining closely related entities from the user graph is creating embeddings that can be used at runtime to fine semantically matching entities related to the entity of interest. The user graph processor 408 may generate embeddings for nodes of the user graph as encoded feature vectors. The embedding may be a core representation of each node within the user graph or user sub-graph. For example, the graph processor 408 may generate a 512-feature value vector, such as a vector having sixteen elements (e.g., n=16 dimensions), each element being a 32-bit float value or integer value. In some examples, the embedding for each node may have a size larger or smaller than 512 bits such as a 256-bit vector. In other examples, the vector has different element sizes, such as a first element that is 32 bits, a second element that is 20 bits, a third element that is 16 bits, etc.

Generally, the user graph processor 408 generates embeddings having the same size for nodes of the user sub-graph, even for nodes of different entity types. In other words, a user node (e.g., manager node 215) has an embedding that is the same size as a document node (e.g., agenda node 270) or an event node (e.g., meeting node 255). Accordingly, the user graph processor 408 may readily compare nodes of different types.

If an embedding is created for each node it may be updated periodically based on the design considerations of the system. For example, the embedding may be updated daily, weekly, or on some other periodic interval to include a new node and/or relationship. In some instances, the embedding may be updated on a periodic basis aligned with the update cycle for the user graph. When embeddings are generated at different times, the user graph processor 408 may be configured to generate embeddings as a background task. The embedding generated for each node may be specific to the user in the same way as the user graph and user sub-graphs are specific to each user. This means that the set of embeddings for one user may be distinct from the set of embeddings generated for another user, even if the embeddings are generated based on the same entity of interest (e.g., the same meeting, document, entity, etc.).

Generally, a format or structure of the embedding is selected to be a compact representation of the entity that may be more easily processed by general purpose processors. In this way, a personal computer or even a smartphone may process the embeddings and provide closely related entities in real-time or near real-time. In some examples, the use of embeddings by the user graph processor 408 enables faster searching and insight generation because the user sub-graph does not need to be accessed or searched in its entirety. For example, the graph processor 408 may generate embeddings for nodes of the sliced user sub-graph. It may then compare the embedding of the entity of interest to the embeddings of the other nodes in the user sub-graph to find the other nodes with the closest matching embeddings. Those nodes that most closely match the embedding of the entity of interest may be identified as closely related entities. The embedding approach provides the benefit of performing a search of the user sub-graph without needing to perform a graph walk, generate clusters, or search for keywords within content of the nodes each time an insight is triggered.

For example, when the user sub-graph includes 1000 nodes, then the user graph processor 408 may generate 1000 embeddings with one embedding per node. These 1000 embeddings may be referred to as a set of embeddings. In some examples, embeddings of the set of embeddings may correspond to different types of entities within an enterprise organization, for example, document types, user types, meeting types, etc. As another example, when the user graph includes 1000 nodes, the user graph processor 408 may generate 3000 embeddings with three embeddings per node. In this example, each embedding for a particular node may correspond to a set of embeddings for the 1000 nodes and the 3000 embeddings may be referred to as a plurality of sets of embeddings. In other examples, the user graph processor 408 may generate embeddings for only predetermined types of nodes, such as only user nodes, or only document, email, and user nodes. Advantageously, the user graph processor 408 may generate the embeddings offline and store the embeddings for later use. Moreover, since the embeddings have a reduced size (e.g., 512 bits), embeddings for a large user graph or user sub-graph with even millions of nodes are more easily generated and processed.

The user graph processor 408 may generate embeddings using fast random projections (FastRP), graph neural networks, random walks, Node2Vec, or other suitable algorithms for embedding generation. In some examples, the user graph processor 408 generates embeddings based on the Johnson-Lindenstrauss lemma, wherein a set of points in a high-dimensional space can be embedded into a space of much lower dimension in such a way that distances between the points are nearly preserved. In one such example, the user graph processor 408 generates embeddings by determining a weighted sum of projections for different degrees of a graph transition matrix. In some examples, the user graph processor 408 divides the user graph and/or the user sub-graph into sparsely connected sub-graphs and generates embeddings using a distributed processing system with parameter sharing among processing nodes.

The user graph processor 408 may be configured to determine a confidence value for similarity between embeddings. For example, the user graph processor 408 may determine a relatively high confidence value (e.g., 0.98) when the embeddings for two nodes are very similar and relatively low confidence value (e.g., 0.2) when the embeddings are not similar. Generally, a high confidence value above a predetermined threshold (e.g., 0.7 or more) indicates that the corresponding nodes have, or should have, a relationship. The user graph processor 408 is configured to calculate a squared Euclidean distance between the embeddings as the confidence value, in some examples. In other examples, the user graph processor 408 determines a different distance metric for comparing the embeddings, for example, a Manhattan distance, a Minkowski distance, or Hamming distance.

One of the benefits of using embeddings to identify closely related entities is that it may be more insightful for entities of interest that do not have may direct relationships within the enterprise (e.g., new employees, new clients, new business ventures within an existing group, etc.). For example, when a user is a new employee who has not had many interactions with documents that are common to that user's department (e.g., monthly documents for the monthly accounting department meeting), the user may not have sufficient relationships with commonly used financial documents or other users within the accounting department for a graph walk or clustering alone to provide useful insights. As such, if the entity of interest for the user sub-graph is a previous month's accounting meeting, embeddings may be generated based on this user sub-graph which may identify other users and documents with similar embeddings from the previous meeting. The entities that are identified as having matching embeddings to the entity of interest may be categorized as closely related entities.

Although each of the analysis approaches is described singularly, it should be appreciated that they may be used in combination with each other as a first algorithm and second algorithm and in a variety of analysis orders by the user graph processor 408. For example, if an entity of interest in a user sub-graph is a meeting with a very large number of entities in the graph, initially the embedding approach may be applied as a first algorithm to identify closely related entities to produce a reduced data set. Then, a clustering algorithm may be applied as a second algorithm to the output closely related entities to group them based on similarity. This may be sufficient to produce the required closely related entities. Or if additional granularity is desired, a plurality of subsequent algorithms may be applied iteratively (e.g., iterations of a graph walk or random walk algorithm may be performed on one or more clusters and/or a subsequent embedding algorithm on the clusters, etc.) to produce more refined closely related entities.

Once the closely related entities are identified, they may be ranked and filtered by the user graph processor 408. As with the approaches for identifying closely related entities, each of the ranking and filtering methods described herein may be used singularly or in combination with each other or another approach and performed in a variety of analysis orders. In some instances, ranking may be performed based on importance to the entity of interest. In examples, affinity features may be generated to assist with ranking the entities. The affinity features may analyze how often an entity occurs, where an entity is located within the user sub-graph, and who is involved or accesses an entity on a recurring basis as a measurement function showing the probability of past, present, and/or future occurrence of the entity. Examples of affinity features may include the number of times an entity appears in emails within the user sub-graph, keywords or phrases that commonly occur in an entity, how often a person appears as a required invitee to a meeting versus an optional invitee, and/or whether similar groups of people are commonly invited to meetings, etc. The affinity features may be utilized to adjust the PPR scores, similarity scores, threshold values, and/or embeddings for an entity based on relative importance to the entity of interest.

In other instances, ranking of closely related entities may be based on relevance to the entity of interest. It should be appreciated that there are numerous methods to rank the closely related entities for relevance to the entity of interest. One example may be to use the PPR scoring method described previously to rank identified entities. In this instance, the closely related entities would be ranked based on a PPR score for relevance and adjusted accordingly. Another method may be to use a feature-based supervised machine learning ranking model trained with a few thousand labeled entity to entity pairs categorized by defined relevance features. In this method the relevance features are defined based on the desired insights when centered on the entity of interest. Examples of possible entity to entity relevance features include a Jaccard overlap ratio between associated users and document sets for entity pairs, number of descriptions available for entity pairs, cosine similarity between entity embeddings produced on semantic content associated with the entities, semantic embedding similarity on entity names, overlap ratio among established people for entities, semantic embedding similarity on entity names, count of established users for related entities, count of established documents for related entities, an overlap ratio among established documents for entities, count of definitions for related entities, semantic embedding similarity on top document titles, and/or count of definitions of the entity of interest. Additionally, the user graph processor 408 may also leverage the generated embeddings as described above as part of the relevance features in the ranking determination.

The user graph processor 408 may further refine the closely related topics by filtering out closely related entities based on filtering parameters. The filtering parameters could be any of multiple limits designed to remove noisy closely related entities from the insights. Examples of filtering parameters include filtering out entities if they do not co-occur in any document from an entity within n-levels of the entity of interest, filtering out entities if they have not been accessed within a certain period, filtering out entities if there has been no interaction with the entity either by the user or in general within a certain time period, and/or filtering out entities based on some preference (office location, entity type, etc.).

Once the closely related entities have been identified, and possibly ranked and filtered, the user graph processor 408 may categorize the closely related entities into insight categories. The insight categories may be based on entity type (e.g., emails, documents, files, users, etc.) or on some other basis (e.g., action items, upcoming events, recommended connections, etc.). The categorized closely related entities may then be communicated to the graphical user interface 110 via the network 150 for display as insights on the user device 102.

Figure 5:
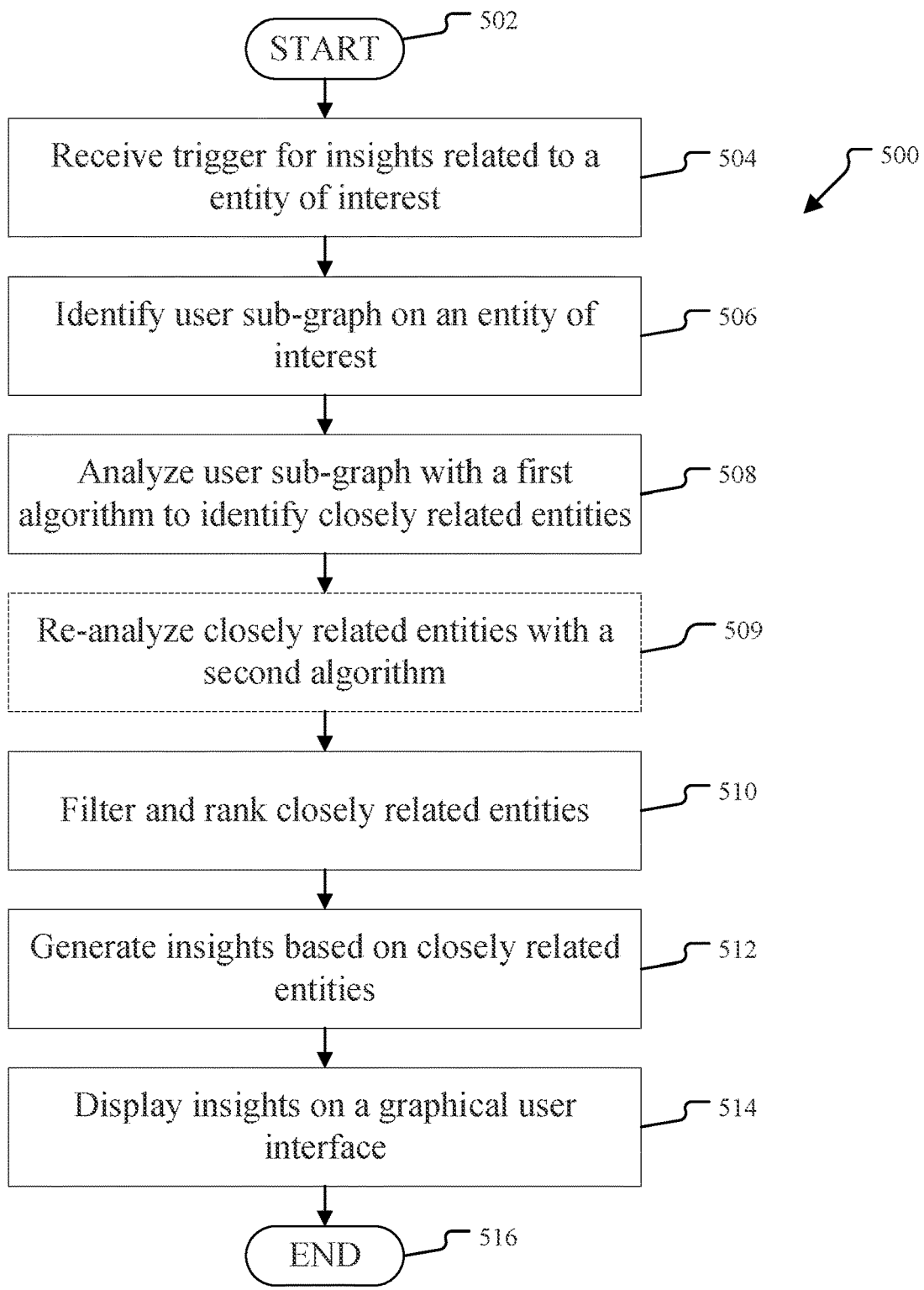
FIG. 5 is an example of a method for generating insights based on closely related entities identified from a user sub-graph.

FIG. 5 is an example of a method for generating insights based on closely related entities identified from a user sub-graph. A general order of the operations for the method 500 is shown in FIG. 5. Generally, the method 500 begins with start operation 502 and ends with end operation 516. The method 500 may include more or fewer steps or may arrange the order of the steps differently than those shown in FIG. 5. The method 500 can be executed as computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2A, 2B, 3, 4, 6, 7, and 8.

Following the start operation 502, the method 500 begins with the receive operation 504, where a trigger for insights is received related to an entity of interest. The trigger may be an explicit trigger by the user requesting insights on an entity of interest or it may be an implicit trigger based on an action whose occurrence indicates that insights could be generated. The trigger may be generated on a user device (e.g., user device 102) by selection of the user graph directly (e.g., selection on an application 406) or by an enterprise device (e.g., enterprise device 106) which recognizes the trigger.

Flow progresses to identify operation 506, where a user sub-graph is identified on an entity of interest. Each user in the enterprise may have a user graph (e.g., user graph 200) stored on an enterprise data store (e.g., enterprise data store 104) that is a user-centric, heterogenous, in-memory graph of user's data. The user sub-graph (e.g., user sub-graph 250) may be a slice of the full user graph based on the entity of interest to reduce the number of nodes and relationships which need to be processed to identify closely related entities and subsequent insights. Thus, the user sub-graph provides efficient access to entities, relationships, and knowledge at runtime with low latencies. The user sub-graph is identified by slicing the user graph on the entity of interest (e.g., a meeting, a user, a document type, etc.) to identify a contextual personalized sub-graph relative to the user on the given entity.

Flow progresses to analyze operation 508, where the user sub-graph is analyzed with a first algorithm to identify closely related entities. Closely related entities of a user sub-graph (e.g., user sub-graph 250) may be analyzed by a user graph processor (e.g., user graph processor 408). The user graph processor may utilize various analysis approaches as the first algorithm to identify closely related entities. The first algorithm utilized may be a graph walk or random walk algorithm based on an entity of interest in the user sub-graph; applying a clustering algorithm on top of the user sub-graph to group and identify closely related entities; and/or creating an embedding algorithm that can be used at runtime to find semantically matching entities related to the entity of interest.

Flow progresses to re-analyze operation 509, where the optional step of re-analyzing the closely related entities with a second algorithm may be performed. In some instances, it may be preferable to take the output closely related entities from operation 508 and re-analyze them with a second algorithm to further refine the identified closely related entities. The re-analysis may be performed with a user graph processor (e.g., user graph processor 408) such that the closely related entities are identified using a combination of both the first algorithm and second algorithm. The second algorithm may be a graph walk or random walk algorithm, clustering algorithm, and/or embedding algorithm as described herein. In this instance, the second algorithm applied to the closely related entities may be an alternative algorithm which was not applied as the first algorithm. For example, if the first algorithm applied was a graph-walk algorithm, the second algorithm may be a clustering algorithm or an embedding algorithm. Alternatively, if the first algorithm applied was an embedding algorithm the second algorithm may be a graph walk and/or clustering algorithm. It should be appreciated that this optional analysis process may be iterative, such that multiple iterations of subsequent algorithms could be applied to the output closely related entities to further refine the results. The optional re-analysis with a second algorithm is beneficial because it leverages the analysis of the first algorithm to generate more diverse closely related entities with minimal increase in processing time. This is because the analysis is performed on a reduced sample set of closely related entities as opposed to analyzing a complete user graph or user sub-graph with each algorithm.

Flow progresses to filter and rank operation 510, where the identified closely related entities are filtered and ranked to further refine the results. A user graph processor (e.g., user graph processor 408) may filter and rank the closely related entities to further refine the results and eventual insights. The closely ranked entities may be ranked for relevance to the entity of interest and/or importance to the entity of interest. The closely ranked entities may also be filtered based on filtering parameters designed to remove noisy closely related entities from the insights. The approaches to ranking and filtering the closely related entities may applied singularly or in combination with each other and in any order of analysis based on the design choices of the method.

Flow progresses to generate operation 512, where insights are generated based on the closely related entities. Once the closely related entities are identified, filtered, and ranked by a user graph processor (e.g., user graph processor 408) they may be grouped into insight categories by the user graph processor. The user graph processor may group the closely related entities by entity type such that similar types of users, documents, or meetings are shown in one category and/or by action type such that entities that share similar recommended actions are grouped together. Example action types may include upcoming events, recommended contacts, updates to documents, new entities added to the enterprise network, and a plurality of other action types which may be useful to the user.

Flow progresses to display operation 514, where the insights may be displayed to the user via a graphical user interface. The generated insights may be transmitted from a user graph processor (e.g., user graph processor 408) to a computing device (e.g., user device 102) via a network (e.g., network 150) for display on a graphical user interface (e.g., graphical user interface 110). The graphical user interface may present the insights as a plurality of selectable insight categories with a plurality of selectable insight icons and links to the underlying closely related entities. The method operation ends with the end operation 516.

Figure 6:
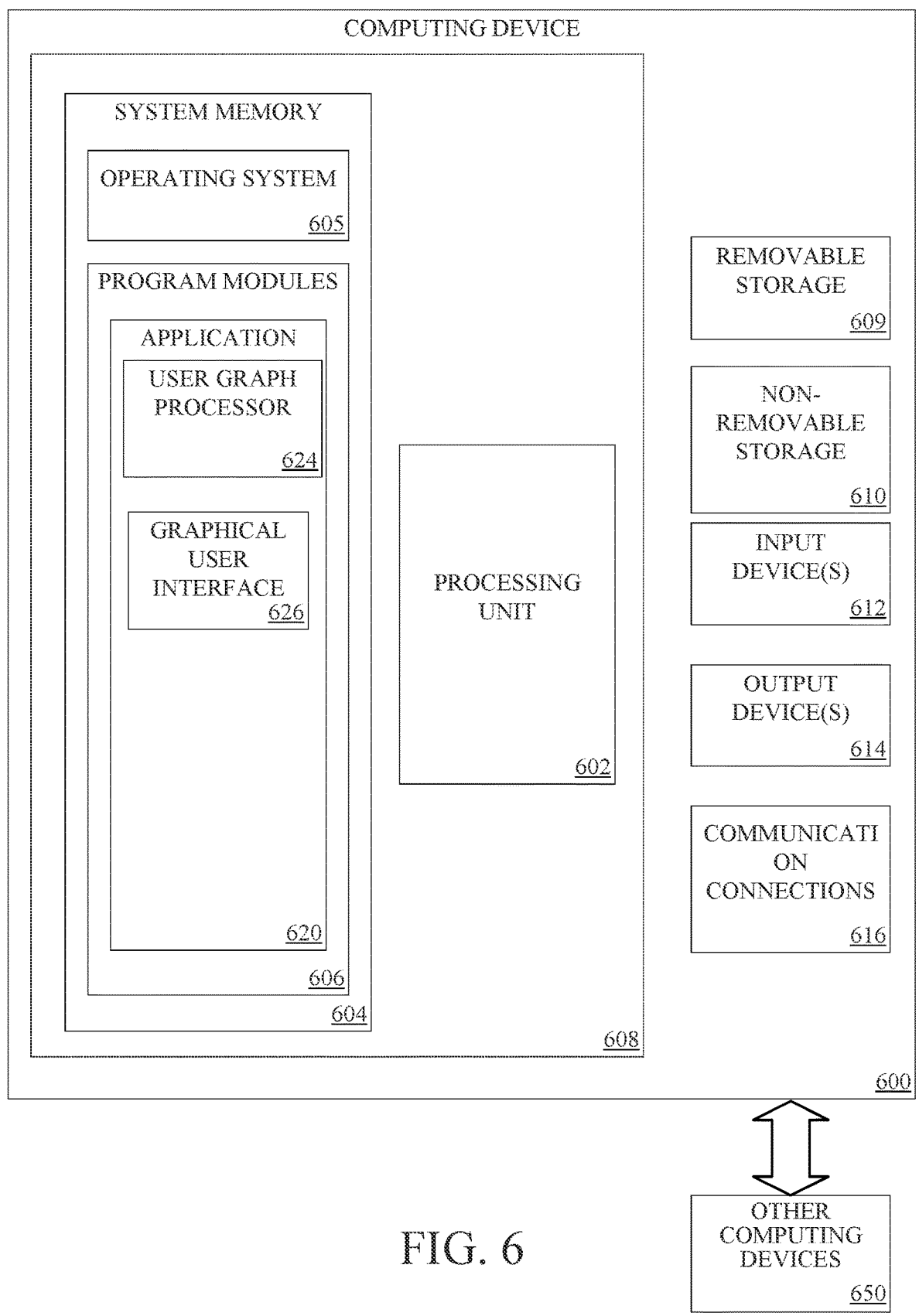
FIG. 6 is a block diagram illustrating example physical components of a computing device with which aspects of the disclosure may be practiced.
Figure 7:
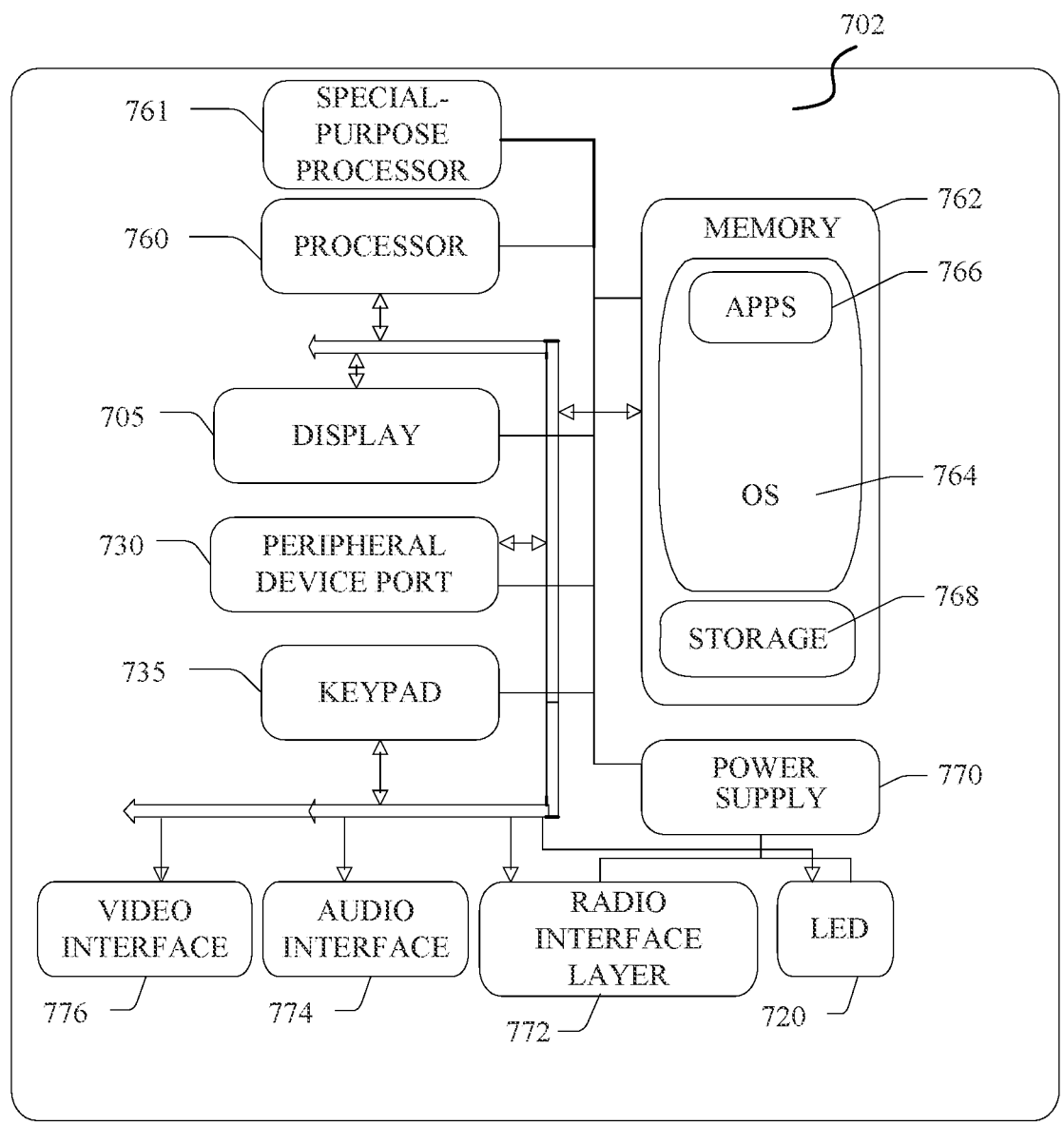
FIG. 7 are simplified block diagrams of a mobile computing device with which aspects of the present disclosure may be practiced.
Figure 8:
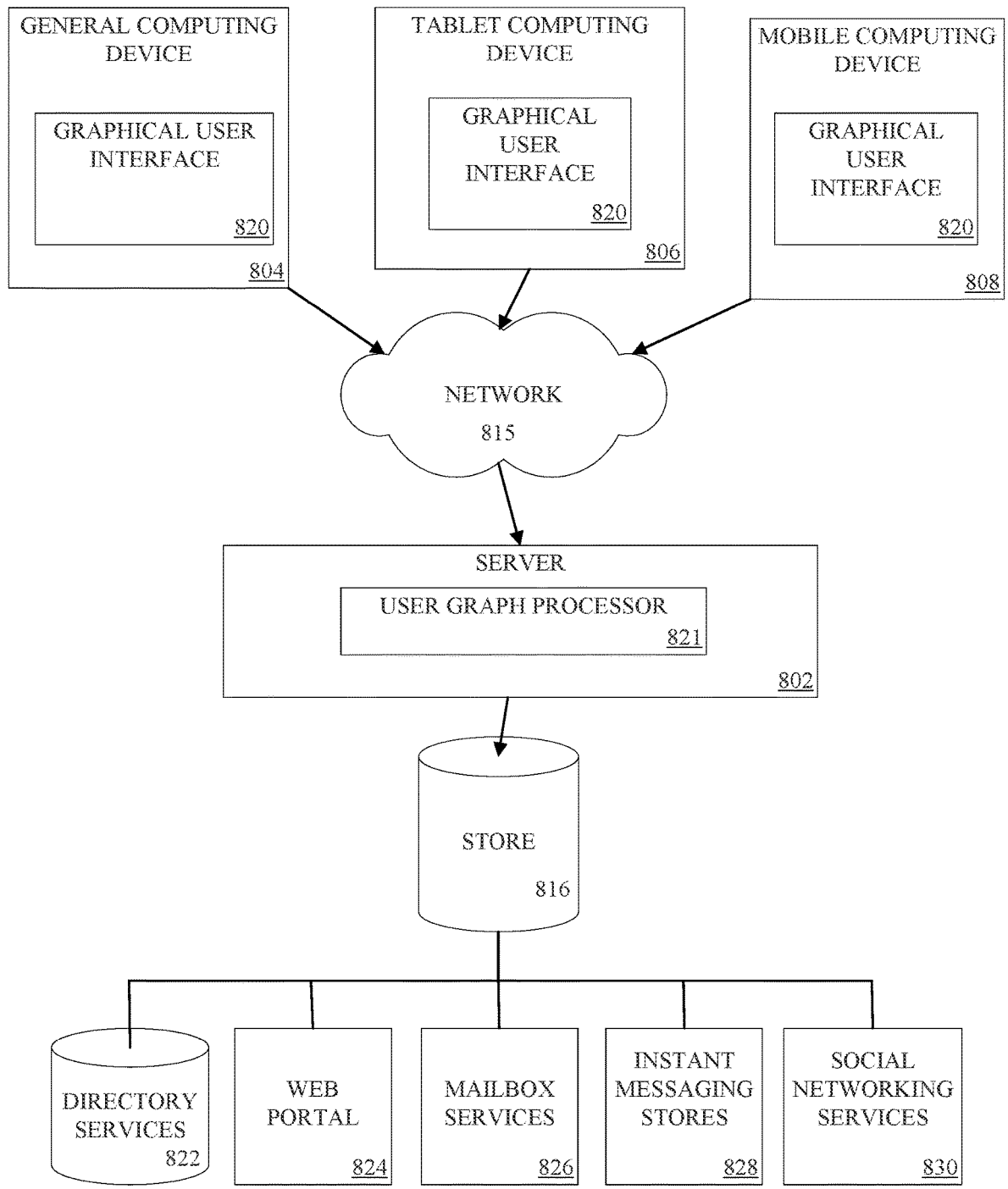
FIG. 8 is a simplified block diagram of a distributed computing system in which aspects of the present disclosure may be practiced.

FIGS. 6-8 and the associated descriptions provide a discussion of a variety of operating environments in which aspects of the disclosure may be practiced. However, the devices and systems illustrated and discussed with respect to FIGS. 6-8 are for purposes of example and illustration and are not limiting of a vast number of computing device configurations that may be utilized for practicing aspects of the disclosure, described herein.

FIG. 6 is a block diagram illustrating physical components (e.g., hardware) of a computing device 600 with which aspects of the disclosure may be practiced. The computing device components described below may be suitable for the computing devices described above, including user device 102, as well as one or more devices associated with enterprise devices 106 and 108. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. As examples, system memory 604 may store prompt store 624 and model interaction manager 626. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 7 is a block diagram illustrating the architecture of one aspect of a computing device 700 (not shown) for example, a mobile telephone, a smart phone, wearable computer (such as a smart watch), a tablet computer, a laptop computer, and the like, with which embodiments of the disclosure may be practiced. In some aspects, the client may be a mobile computing device. That is, the computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 1068 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the computing device 700 and stored via the system 702 may be stored locally on the computing device 700, as described above, or the data may be stored on any number of storage media that may be accessed by the device via the radio interface layer 772 or via a wired connection between the mobile computing device 700 and a separate computing device associated with the computing device 700, for example, a server computer in a distributed computing network, such as the Internet. As should be appreciated such data/information may be accessed via the computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

A graphical user interface 820 may be employed by a client that communicates with server device 802, and/or multimodal machine learning engine 821 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
   receiving a trigger related to an entity of interest;
   identifying a user sub-graph on the entity of interest;
   analyzing the user sub-graph by applying a first machine learning algorithm to the user sub-graph to identify a first set of a plurality of closely related entities;
   re-analyzing the user sub-graph by applying a second machine learning algorithm to the first set of a plurality of closely related entities to identify a second set of one or more other closely related entities, the second set of closely related entities being a subset of the first set of closely related entities identified by the first machine learning algorithm, wherein the second machine learning algorithm is different from the first machine learning algorithm, and an output of the second machine learning algorithm including the second set of one or more closely related entities is applied as feedback to update the first machine learning algorithm to refine the first set of a plurality of closely related entities;
   generating an insight based on the second set of one or more closely related entities; and
   causing to display the insight on a graphical user interface.

2. The system of claim 1, wherein the first machine learning algorithm is a graph walk algorithm, and the second machine learning algorithm is a clustering algorithm, each used in combination with the other to identify one or more closely related entities.

3. The system of claim 1, wherein the first machine learning algorithm is a graph walk algorithm, and the second machine learning algorithm is an embedding algorithm, each used in combination with the other to identify one or more closely related entities.

4. The system of claim 3, further comprising creating an embedding for one or more nodes in the user sub-graph.

5. The system of claim 1, further comprising ranking the one or more closely related entities for relevance to the entity of interest and importance to the entity of interest.

6. The system of claim 1, wherein the entity of interest comprises at least one of a meeting, a user, a document, an email, a chat, a team of people within the enterprise, a client list, a meeting agenda, a presentation, a preference, or a task.

7. The system of claim 1, further comprising filtering the one or more closely related entities.

8. A method comprising:
receiving a trigger related to an entity of interest;
identifying a user sub-graph on the entity of interest;
analyzing the user sub-graph by applying a first machine learning algorithm to the user sub-graph to identify a first set of a plurality of closely related entities;
re-analyzing the user sub-graph by applying a second machine learning algorithm to the first set of a plurality of closely related entities to identify a second set of one or more closely related entities, the second set of closely related entities being a subset of the first set of closely related entities identified by the first machine learning algorithm, wherein the second machine learning algorithm is different from the first machine learning algorithm, and an output of the second machine learning algorithm including the second set of one or more closely related entities is applied as feedback to the first machine learning algorithm to refine the first set of a plurality of closely related entities;
generating an insight based on the second set of one or more closely related entities; and
causing to display the insight on a graphical user interface.

9. The method of claim 8, wherein the first machine learning algorithm is a clustering algorithm, and the second machine learning algorithm is a graph walk algorithm, each used in combination with the other to identify one or more closely related entities.

10. The method of claim 8, wherein the first machine learning algorithm is a clustering algorithm, and the second machine learning algorithm is an embedding algorithm, each used in combination with the other to identify one or more closely related entities.

11. The method of claim 10, further comprising creating an embedding for one or more nodes in the user sub-graph.

12. The method of claim 8, further comprising ranking the one or more closely related entities for relevance to the entity of interest and importance to the entity of interest.

13. The method of claim 8, wherein the entity of interest comprises at least one of a meeting, a user, a document, an email, a chat, a team of people within the enterprise, a client list, a meeting agenda, a presentation, a preference, or a task.

14. The method of claim 8, further comprising filtering the one or more closely related entities.

15. A non-transitory computer-readable storage medium comprising instructions being executable by one or more processors to perform a method, the method comprising:
receiving a trigger related to an entity of interest;
identifying a user sub-graph on the entity of interest;
analyzing the user sub-graph by applying a first machine learning algorithm to identify a first set of a plurality of closely related entities;
re-analyzing the user sub-graph by applying a second machine learning algorithm to identify a second set of one or more other closely related entities, the second set of closely related entities being a subset of the first set of a plurality of closely related entities identified by the first machine learning algorithm, wherein the second machine learning algorithm is different from the first machine learning algorithm, and an output of the second machine learning algorithm including the second set of one or more closely related entities is applied as feedback to the first machine learning algorithm to refine the first set of a plurality of closely related entities;
generating an insight based on the second set of closely related entities; and
causing to display the insight on a graphical user interface.

16. The non-transitory computer-readable storage medium of claim 15, wherein the first machine learning algorithm is an embedding algorithm, and the second machine learning algorithm is a graph walk algorithm, each used in combination with the other to identify one or more closely related entities.

17. The non-transitory computer-readable storage medium of claim 15, wherein the first machine learning algorithm is an embedding algorithm, and the second machine learning algorithm is a clustering algorithm, each used in combination with the other to identify one or more closely related entities.

18. The non-transitory computer-readable storage medium of claim 15, further comprising creating an embedding for one or more nodes in the user sub-graph.

19. The non-transitory computer-readable storage medium of claim 15, further comprising ranking the one or more closely related entities for relevance to the entity of interest and importance to the entity of interest.

20. The non-transitory computer-readable storage medium of claim 15, wherein the entity of interest comprises at least one of a meeting, a user, a document, an email, a chat, a team of people within the enterprise, a client list, a meeting agenda, a presentation, a preference, or a task.

* * * * *